United States Patent

Kiehnle et al.

[11] Patent Number: 5,973,433
[45] Date of Patent: *Oct. 26, 1999

[54] BRUSH SUPPORT PLATE

[75] Inventors: J Gunter Kiehnle, Eppingen; Bernd Walther, Bietigheim-Bissingen; Christof Heuberger, Vaihingen, all of Germany

[73] Assignee: ITT Manufacturing Enterprises Inc., Wilmington, Del.

[*] Notice: This patent is subject to a terminal disclaimer.

[21] Appl. No.: 08/860,247
[22] PCT Filed: Aug. 31, 1995
[86] PCT No.: PCT/EP95/03415
    § 371 Date: Sep. 8, 1997
    § 102(e) Date: Sep. 8, 1997
[87] PCT Pub. No.: WO96/19030
    PCT Pub. Date: Jun. 20, 1996

[30] Foreign Application Priority Data

Dec. 15, 1994 [DE] Germany ............... 44 44 645

[51] Int. Cl.⁶ .................................................. H02K 13/00
[52] U.S. Cl. ........................... 310/239; 310/249; 310/43
[58] Field of Search .................... 310/239, 249, 310/43

[56] References Cited

U.S. PATENT DOCUMENTS

| 1,706,255 | 3/1929 | Richard et al. |
| 4,041,339 | 8/1977 | Huber et al. |
| 4,673,837 | 6/1987 | Gingerich et al. |
| 4,845,396 | 7/1989 | Huber ............................ 310/239 |
| 5,821,663 | 10/1998 | Kiehnle et al. ................. 310/249 |

FOREIGN PATENT DOCUMENTS

| 235443 | 9/1987 | European Pat. Off. |
| 484287 | 5/1992 | European Pat. Off. |
| 489940 | 6/1992 | European Pat. Off. |
| 3804677 | 8/1989 | Germany |
| 4018846 | 12/1991 | Germany |
| WO 9410738 | 5/1994 | WIPO |
| WO 9619030 | 6/1996 | WIPO |
| WO 9619060 | 6/1996 | WIPO |

OTHER PUBLICATIONS

German Search Report of German Parent Application No. P4444645.4 filed Dec. 15, 1994.
German Patent Application No. G 8908892.1 file Nov. 9, 1989.
German Patent Application No. G 9116586.5 filed Aug. 26, 1993.
English translation of the International Preliminary Examination Report of Application No. PCT/EP95/03415 filed Aug. 31, 1995.

Primary Examiner—Nestor Ramirez
Assistant Examiner—Thanh Lam
Attorney, Agent, or Firm—J. Gordon Lewis

[57] ABSTRACT

A brush support plate (1) is disclosed. The current supply to the brush (21) is effected by way of conductor paths (10, 11) which are almost completely embedded into the material of the support plate. Recesses (30, 31, 32, 33) permit welding or soldering the strands (20) of the brush (21) to the conductor paths (10, 11).

5 Claims, 1 Drawing Sheet

BRUSH SUPPORT PLATE

The present invention relates to a brush support plate as claimed in claim 1. International publication No. WO 94/107 328, for example, discloses a brush support plate of this type. The plate is additionally used to partly accommodate a bearing for the armature shaft of the motor. The plate abuts flatly on the flange side of a pump housing. It is not shown in this publication how the brushes on the brush support plate are involved in the current supply.

The present invention proposes in this respect the inclusion of conductor paths in the support plate, to which the strands of the brushes can be welded.

The conductor paths are almost completely embedded in the material of the brush support plate. Only small recesses in the material are provided and extend up to the conductor paths so that at these openings the strands of the brushes may e.g. be welded to the conductor paths.

The advantage of the almost complete embedding of the conductor paths in the support plate is that the conductor paths may be aligned at will with respect to the casings for the brushes because there is no electrically conductive contact.

Further embodiments of the present invention are described in the subclaims.

The invention described in the above will be explained by way of an embodiment which is shown in two Figures.

Figure 1:
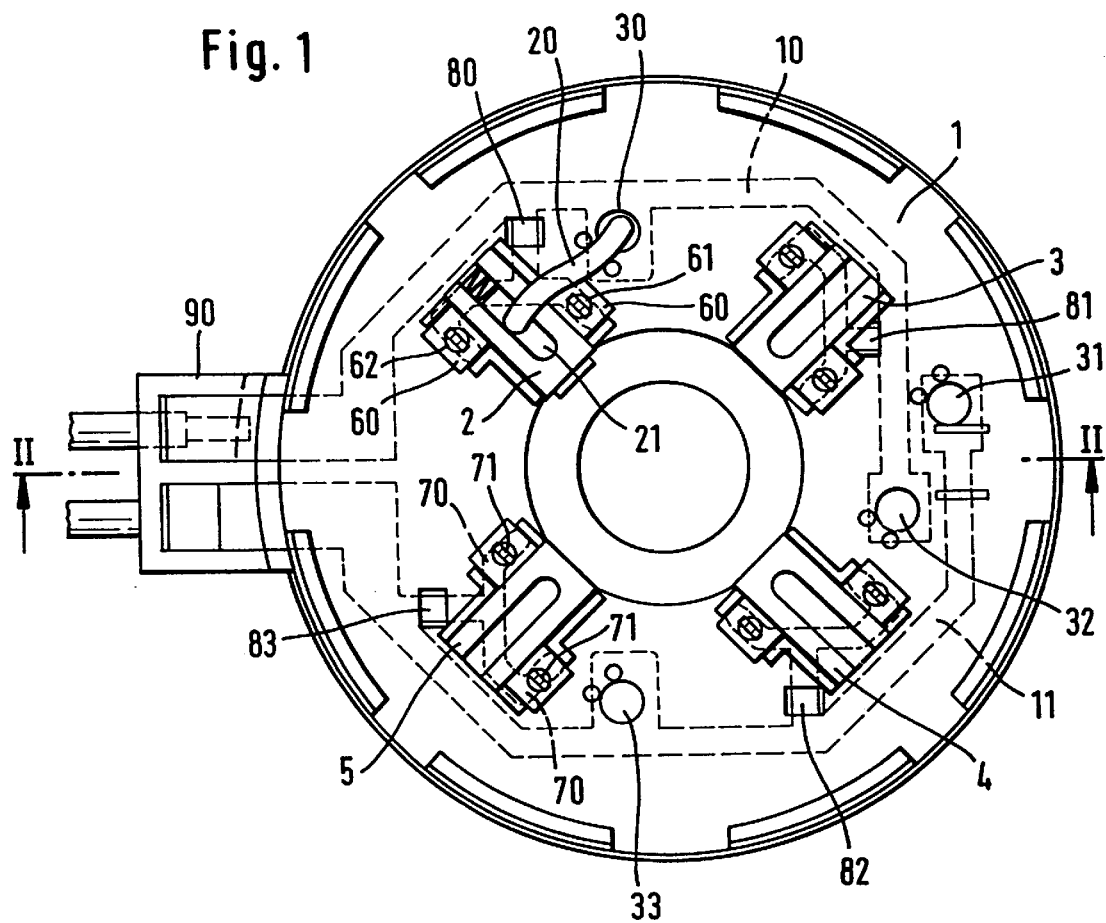
FIG. 1 is a top view of a brush support plate.
Figure 2:
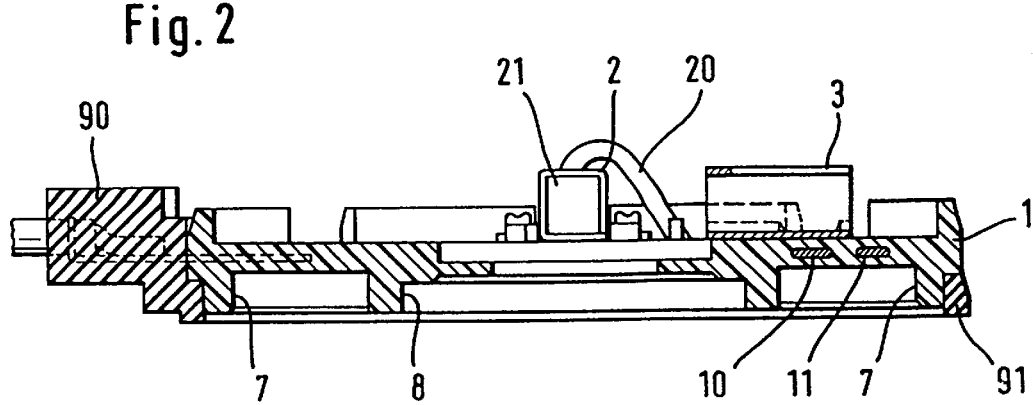
FIG. 2 is a cross-section taken along the line II—II.

Mounted on the top side of the brush support plate 1 are a plurality of casings 2, 3, 4, 5, two of them being connected in parallel in each case. The bottom side of the brush support plate 1 includes a circular indentation 8, into which a bearing can be inserted with part of its length. International publication No. WO 94/10738 is referred to in this respect. Extending concentrically around the central indentation 8 is a groove 7 having roughly the same depth as the central indentation 8.

Two conductor paths 10, 11 are arranged in the brush support plate.

During manufacture of the brush support plate, the conductor paths are injection-molded in the plastic material, of which the plate is made. This means that the conductor paths 10, 11 are electrically insulated, especially with respect to the casings 2, 3, 4, 5 which are mounted on the top side of the brush support plate 1.

Brushes are guided in the casings and are connected to the conductor paths in an electrically conductive manner by way of strands. This condition is described exemplarily for one of the casings.

To provide a contact between the strand 20 of brush 21 in casing 2 and the conductor path 10, the brush support plate includes a recess 30 (respectively 31, 32, 33 for the other strands) which extends up to the conductor path 10 (or 11). Thus, the conductor paths are open at points and may be soldered or welded, for example, to the strands at these points. To facilitate the attachment, recesses are provided not only on the top side of the brush support plate but also on the bottom side thereof. The recesses are opposite to one another. This permits, for example, having welding electrodes extend up to the conductor path.

The casings for the brushes are fastened as follows:

The casings are folded from a sheet metal, and lateral fastening lugs 60 are provided, each including a fastening hole.

The fastening lugs 60 extend in parallel to the conductor plate 1.

Attachment paths 70 are provided on the conductor paths 10, 11 for each casing 2. Vertically projecting tongues 71 are provided on the attachment paths (shown as an example for casing 5 in dash-dotted lines).

The size of the tongues is so that they protrude from the top surface of the conductor plate. The tongues are positioned so as to align with holes 61 and 62, thereby ensuring that the casings can reliably be retained on the brush support plate by deflecting the tongues which project from the holes 60, 61. The attachment paths 70 are connected to the conductor paths 10, 11 through disconnecting points 80, 81, 82, 83.

The disconnecting points 80, 81, 82, 83 are separated either before or after the injection molding process for manufacturing the brush support plate. Thus, at least the casings having brushes which are not contacted by the associated conductor path are electrically insulated by the corresponding conductor path.

The two conductor paths 10, 11 extend roughly semicircularly in the brush support plate 1 and together enclose in about a circle.

One end of each semicircular conductor path 10, 11 terminates in a plug housing 90. There, the ends are connected to lines leading to the outside, or end into a plug-in accommodation means.

The plug housing 90, together with a seal 91, is injection-molded on the brush support plate. The material of the plug housing and the seal is somewhat softer than the material of the brush support plate. Seal 91 extends in a groove which is open downwardly and towards the side, and seal 91 projects both in a downward and a radially outward direction. Thus, a sealing effect is provided relative to a bowl-shaped housing, having its rim shifted over the rim of the brush support plate, and relative to a flange surface on a housing for the engine-transmission unit or pump which is to be driven by the electric motor. International publication No. 94/10738 is again referred to in this respect.

We claim:

1. A brush support plate made of plastic material including flat conductor paths which extend in the support plate for an electrical connection between a plug housing and connecting strands of brushes, which are mounted on a top side of the brush support plate, wherein on the top side recesses are provided in the brush support plate which reach up to the conductor paths so that the strands can be attached to the conductor paths, wherein recesses are also provided on a bottom side of the brush support plate which are opposite to the top side recesses and also reach up to the conductor paths.

2. The brush support plate as claimed in claim 1, wherein attachment paths are provided on the conductor paths through disconnecting points, the attachment paths having vertically deflected lugs which project from the top side of the brush support plate.

3. The brush support plate as claimed in claim 1, wherein a seal is injection-molded on the bottom side of the brush support plate and reaches over the bottom side and radially outwardly beyond the rim of the brush support plate.

4. The brush support plate as claimed in claim 3, wherein, at the rim of the support plate, a plug housing is provided which is integrally designed with the ring seal.

5. The brush support plate as claimed in claim 1, wherein the brush support plate carries four brushes, two of them being connected in parallel in each case.

* * * * *